US012762321B2

(12) United States Patent
Parthasarathy et al.

(10) Patent No.: US 12,762,321 B2
(45) Date of Patent: Oct. 13, 2026

(54) OPTIMIZING MACHINE LEARNING CLASSIFICATION MODELS FOR RESOURCE CONSTRAINTS IN ELECTRONIC DESIGN AUTOMATION (EDA) COMPUTER AIDED DESIGN (CAD) FLOWS

(71) Applicant: Synopsys, Inc., Sunnyvale, CA (US)

(72) Inventors: Ganapathy Parthasarathy, Fremont, CA (US); Bhuvnesh Kumar, San Jose, CA (US); Saurav Nanda, San Jose, CA (US); Parivesh Choudhary, Sunnyvale, CA (US); Sridhar Rajakumar, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 775 days.

(21) Appl. No.: 18/141,257

(22) Filed: Apr. 28, 2023

(65) Prior Publication Data

US 2024/0135084 A1 Apr. 25, 2024

Related U.S. Application Data

(60) Provisional application No. 63/415,032, filed on Oct. 11, 2022.

(51) Int. Cl.
*G06F 30/398* (2020.01)
*G06F 119/02* (2020.01)

(52) U.S. Cl.
CPC ........ *G06F 30/398* (2020.01); *G06F 2119/02* (2020.01)

(58) Field of Classification Search
USPC .......................................................... 716/111
See application file for complete search history.

(56) References Cited

U.S. PATENT DOCUMENTS

2007/0028206 A1* 2/2007 Chou ........................ G03F 1/36 716/51
2010/0131259 A1* 5/2010 Joshi ..................... G11C 11/412 703/14
2016/0148850 A1* 5/2016 David ...................... H10P 74/23 355/53
2016/0378717 A1* 12/2016 Reid ..................... G06F 30/367 703/2
2017/0109646 A1* 4/2017 David ....................... G06N 7/01
2022/0011728 A1* 1/2022 Zhang .................. G05B 13/027

FOREIGN PATENT DOCUMENTS

CN 1216377 A * 5/1999 ............. G06F 30/23

* cited by examiner

*Primary Examiner* — Mohammed Alam
(74) *Attorney, Agent, or Firm* — Patterson + Sheridan, LLP

(57) ABSTRACT

Optimizing ML models for resource constraints in electronic design automation (EDA) computer aided design (CAD) flows, including computing a set of bin thresholds based on slope changes in an ordered set of discrete probabilistic classification scores, assigning the discrete probabilistic classification scores to the bins based on the values of the discrete probabilistic classification scores and the bin thresholds, and selecting processes associated with the discrete probabilistic classification scores of one or more of the bins based on costs of the respective processes and a global budget.

20 Claims, 15 Drawing Sheets

800

Disclosed Technique, Changelist 1

| Change Point | 1 | 2 | 3 | 4 | 5 | 6 | 7 | 8 |
|---|---|---|---|---|---|---|---|---|
| Cutoff index | 30 | 85 | 192 | 348 | 402 | 494 | 610 | 730 |

| Sensitivity | 1 | 3 | 5 | 10 | 50 | 100 | 200 | 400 | 500 | 1000 |
|---|---|---|---|---|---|---|---|---|---|---|
| **Knee index** | 1 | 5 | 5 | 108 | 208 | 208 | 208 | 208 | 208 | 208 |

802

804

Disclosed Technique, Changelist 2

| Change Point | 1 | 2 | 3 | 4 | 5 | 6 |
|---|---|---|---|---|---|---|
| Cutoff index | 90 | 187 | 374 | 583 | 746 | 831 |

806

| Sensitivity | 1 | 3 | 5 | 10 | 50 | 100 | 200 | 400 | 500 | 1000 |
|---|---|---|---|---|---|---|---|---|---|---|
| Knee index | 7 | 12 | 12 | 34 | 391 | 554 | 554 | 554 | 554 | 554 |

902

Design D2

900

Design D1

904

Design D3

Design D2

Design D1

Design D3

OPTIMIZING MACHINE LEARNING CLASSIFICATION MODELS FOR RESOURCE CONSTRAINTS IN ELECTRONIC DESIGN AUTOMATION (EDA) COMPUTER AIDED DESIGN (CAD) FLOWS

RELATED APPLICATION

The present application claims the benefit of U.S. Application for Provisional Patent No. 63/415,032, filed Oct. 11, 2022, titled "Optimizing Machine Learning Classification Models for Resource Constraints in Electronic Design Automation (EDA) Computed Aided Design (CAD) Flows, which is incorporated herein by reference in its entirety.

TECHNICAL FIELD

The present disclosure relates to machine learning (ML) in electronic design automation (EDA) of circuits. More particularly, the present disclosure relates to optimizing ML classification models for resource constraints in electronic design automation (EDA) computer aided design (CAD) flows.

BACKGROUND

The numbers and complexity of electronic design automation (EDA) tools is increasing dramatically. EDA tools are subject to various costs (e.g., availability/scheduling constraints, user access fees, and time-to-results). In practice, therefore, it is generally not feasible to test a proposed IC design change with an exhaustive array of EDA tools. Moreover, the ability to detect design defects varies amongst EDA tools (e.g., based on the type of defect and/or circuit features).

Machine learning is gaining increasing importance at various stages of integrated circuit design flow. Machine learning is often performed on remote platforms (e.g., cloud-based servers). Remote platforms present additional challenges in terms of dynamic changes in the availability of computational resources, license fees, and time-to-results.

SUMMARY

Disclosed herein are techniques for optimizing ML classification models for resource constraints in electronic design automation (EDA) computer aided design (CAD) flows.

An example is a computer program that causes a processor to compute a set of bin thresholds based on slope changes in an ordered set of discrete probabilistic classification scores, assign the discrete probabilistic classification scores to the bins based on the values of the discrete probabilistic classification scores and the bin thresholds, and select processes associated with the discrete probabilistic classification scores of one or more of the bins based on costs of the respective processes and a global budget.

Another example is an integrated circuit (IC) device that includes smoothing circuitry that smooths a set of ordered discrete probabilistic classification scores to generate a set of smoothed ordered discrete probabilistic classification scores, change point detection circuitry that computes slope changes in the set of smoothed ordered discrete probabilistic classification scores and selects a subset of the slope changes as bin boundaries based on a change-point threshold, and binning circuitry that assigns the discrete probabilistic classification scores to the bins based on the values of the discrete probabilistic classification scores and the bin boundaries.

Another example is a machine-implemented method that includes adaptively binning an ordered set of discrete probabilistic classification scores based on slope changes in the ordered set of discrete probabilistic classification scores, and evaluating the bins consecutively, starting with a bin for which the assigned discrete probabilistic classification scores have the highest values, where the evaluating includes computing a bin cost for a bin based on costs of processes associated with the discrete probabilistic classification scores of the bin, selecting the processes associated with the discrete probabilistic classification scores of the bin if a sum of the bin cost and a tally of costs of previously selected processes is below a global budget, and selecting a subset of the processes associated with the discrete probabilistic classification scores of the bin if the sum exceeds the global budget.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
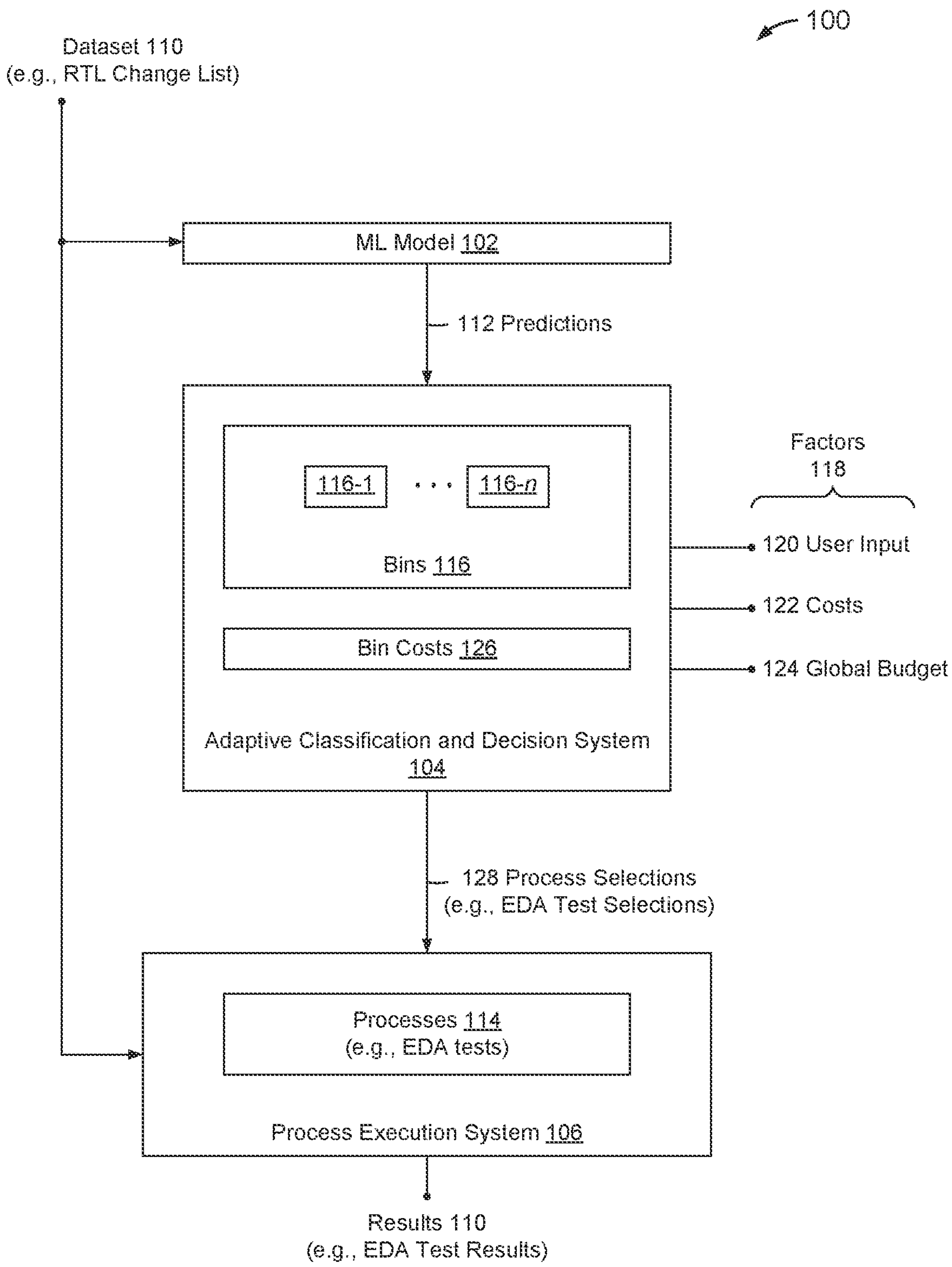
FIG. 1 is a block diagram of a system that includes a machine learning (ML) model, an adaptive classification and decision system, and a process execution system, according to an embodiment.

Aspects of the present disclosure relate to optimizing or improving machine learning (ML) classification models for resource constraints in electronic design automation (EDA) computer aided design flows. More generally, aspects of the present disclosure relate to techniques for selecting a subset of processes based on costs associated with the processes and predicted usefulness of the processes for a given dataset. Techniques are described below with respect to selection of EDA processes (e.g., to detect defects in a circuit design). Techniques disclosed herein are not, however, limited to selecting EDA processes.

For the past few decades, the semiconductor industry has followed twin trajectories of shrinking feature sizes and larger transistor counts in very-large-scale-integration (VLSI) circuits. The industry is dependent on design technology for design closure and productivity to satisfy the pressures of shrinking time-to-market for complex, high quality, low power, and reliable ICs. Electronic design automation (EDA) tools have driven fundamental advances in software, methodologies, and infrastructure to design, verify, and manufacture modern ICs. The EDA environment has evolved from a set of point tools to highly sophisticated, deeply integrated systems designed to manipulate huge amounts of data at different levels of design abstraction efficiently in a distributed computing environment. Evolving design needs and market pressure require EDA software to consistently and efficiently deal with extremely large search spaces with low latencies.

The EDA industry has traditionally employed sophisticated top-down algorithmic approaches that consume increasing amounts of time and other resources, since most EDA problems are NP-complete. Methods based on machine learning (ML) are gaining increasing importance at various stages of the integrated circuit (IC) design flow including EDA applications. Generally speaking, traditional EDA tools provide correctness guarantees, whereas ML methods provide probabilistic guarantees. It can be challenging to balance predictive results of ML methods with competing goals of cost and quality of results (QoR).

Supervised ML classification methods provide models that generate a floating-point score for a new data-point in the range [0.0, . . . , 1.0]. The score is then converted to a label/classification based on a decision function. Decision functions typically use a simple check on a standard threshold. The simple check is often justified based on the central limit theorem (CLT), which states that in general, the normalized sum of independent random variables tends toward a normal distribution even if the original variables themselves are not normally distributed. Where an ML classification model is generated from noisy and/or highly imbalanced training data (i.e., training data that includes many instances of a first label/classification and relatively few instances of a second label/classification), the simple check may lead to inaccurate labeling/classification. For EDA applications, training data sets tend to be small, noisy, and heavily imbalanced, which negatively impacts accuracy.

For static approaches where an ML model is trained infrequently, generalizes well, and is used over an extended period, the challenges of small, noisy, and heavily imbalanced may be controlled with intensive data engineering. Intensive data engineering may, however, necessitate considerable manual intervention and analysis to ensure that a high-quality ML model is generated. Moreover, in many situations, ML models are trained on cloud-based third-party platforms for which data sources and adherence to training data assumptions may vary over time, which increases complexity and costs. In order to minimize failures due to miss-predictions and maintain desired QoR, results from online ML models tend to sacrifice precision over recall. EDA flows are also constrained by dynamic changes in resource availability such as computational/platform costs, license costs, and time-to-results in the IC-design life-cycle.

Aspects of the present disclosure relate to optimizing ML classification models for resource constraints. Techniques are disclosed herein with reference to EDA computer aided design (CAD) flows (e.g., optimizing ML classification model quality-of-results, or QoR) in a resource-constrained environment. As an example, due to resource constraints, it is generally not practical to evaluate a proposed design change to an IC with all available EDA tools. Instead, a ML classification model may be trained to predict efficacies of the respective EDA tools for a dataset (e.g., a probability that an EDA tools will detect a defect in a proposed design change). Techniques are disclosed herein to optimize classification of discrete probabilities generated by a ML model (e.g., related to efficacy of EDA tools for a circuit design), and to select an optimum set of the EDA tools based on the optimized classifications and one or more metrics. Techniques are disclosed herein are not, however, limited to EDA CAD flows.

Optimization may be formally described as a mixed-integer linear programming (MILP) problem as illustrated in Equations 1 and 2.

$$\max \sum_{i=i}^{n} v_i t_i \tag{1}$$

Subject to the constraints:

$$\sum_{i=i}^{n} b_i t_i \leq \beta \tag{2}$$

$$\sum_{i=i}^{n} r_i (1 - t_i) \leq \rho$$

$$\text{where } t_j \in [0, 1], j \in \{1, \ldots, n\}$$

As illustrated in Table 1, below, each object $t_j$ (i.e., prediction/EDA tool) has weight $b_j$ and adds value $v_j$. Value $r_j$ is a regret or cost of missing the failure of $t_j$ (e.g., a user-provided cost for a situation in which an ML model outputs a relatively low probability that an EDA test will detect a defect in a circuit design, but the EDA test would actually have detected the defect). β is a maximum resource constraint or global budget constraint. ρ is a maximum cost of miss-predictions set by the user.

TABLE 1

| Variable Definitions | |
|---|---|
| Variable | Description |
| $t_i \in T$ | object in current set T of predictions |
| $b_i \in \mathbb{R}$ | cost of running object $t_i$ |
| $r_i \in \mathbb{R}$ | cost of wrong classification of object $t_i$ |
| $v_i \in \mathbb{R}$ | value of correct classification of object $t_i$ |
| β | maximum resources for running tests |
| ρ | maximum cost of missing failures |

The MILP problem may be solved using a MILP solver based on user-provided values for the value and cost constraints. However, it takes considerable time to solve when there is a non-trivial number of predictions and budget constraints. Users expect regression predictions with typical latencies of under a minute. An exact near real-time approach is currently impractical because it would involve solving the optimization problem afresh for each prediction.

As disclosed herein, classification is partitioned into multiple sub-processes in which a ML model(s) generates a calibrated discrete probability distribution regarding efficacy of a set of processes for a dataset (e.g., efficacy of EDA tools for a circuit design), and an adaptive classification and decision system optimizes the predictions to provide a reduced set of high-quality optimized probabilities and selects a subset of the processes based on the predictions and a set of metrics (e.g., constraints).

In an embodiment, the adaptive classification and decision system dynamically determines cutoff values, or thresholds for the predictions based on the predictions (e.g., based on a change-point detection method), and groups/bins the predictions using the thresholds as group/bin boundaries. The adaptive classification and decision system then selects the processes associated with one or more of the bins based the set of metrics. The adaptive classification and decision system may select the processes associated with one or more of the bins based in part on cumulative bin costs and a global budget. A subset of processes associated with a bin may be selected when a cost of a bin would exceed the global budget. The adaptive classification and decision system may utilize greedy selection, decreasing density, and/or weighted random selection without replacement. In an embodiment, the adaptive classification and decision system presents the bins and associated bin costs to a user and permits the user to select the processes.

Reducing the set of predictions returned by an ML model (i.e., dimensionality reduction), as disclosed herein, may impact accuracy since accuracy and precision generally follow an inverse relationship. In an embodiment, a user may balance expected budget versus failure rate in the classification model (e.g., based on expected prediction accuracy and precision). A generic optimization method may be used to balance QoR and cost in RTL regressions.

Techniques disclosed herein may reduce latency and improve classification accuracy. Complexity is reduced by generating high-quality adaptive classification bins based on probabilistic classification scores from the ML model. The traditional ML decision function is reduced to deciding which incremental set of bins is optimal for a given cost/quality objective function. Techniques disclosed herein may provide close to optimal solutions to solve a predicted set under constraints.

Techniques disclosed herein may be useful when working with ML models trained with noisy and/or unbalanced training data. Techniques disclosed herein may be useful in a variety of applications, including EDA. Techniques disclosed herein may be useful to reduce resource consumption (e.g., computational resources/time, and time-to-results) in an EDA CAD design flow process. Techniques disclosed herein may be applied to binary classification and multi-class classification.

FIG. 1 is a block diagram of a system 100 that includes a machine learning model 102, an adaptive classification and decision system 104, and a process execution system 106, according to an embodiment.

ML model 102 computes predictions 112 regarding applicability/suitability of processes 114 for a dataset 110.

Adaptive classification and decision system 104 adaptively classifies/groups predictions 112 based on values/strengths of the respective predictions 112, and selects processes 114 (i.e., process selections 128) associated with one or more of the groups based on one or more metrics. The metrics may include one or more factors 118 and/or a metric computed from one or more of factors 118. In the example of FIG. 1, factors 118 include user input 120, costs 122 associated with respective processes 114, and a global budget 124. Costs 122 may include resources consumed by processes 114 (e.g., license fees, computational resources, and/or time-to-completion), and/or other factors (e.g., failure rates/cost of miss-predictions). Metrics computed from factors 118 may include bin costs 126 (e.g., a sum of costs of processes 114 associated with respective bins 116). Global budget 124 may be provided by a user or may be computed from other factors 118. Global budget 124 may, for example, be computed as sum of costs 122 or as linear combination of weighted costs 122. The weights may be pre-determined through rules, heuristically, and/or algorithmically. Process selections 128 may represent processes 114 that are most likely to be useful/suitable for dataset 110, in view of predictions 112 and the one or more metrics.

Process execution system 106 performs processes 114 identified in process selections 128, on dataset 110.

ML model 102, adaptive classification and decision system 104, and process execution system 106 may include circuity (e.g., fixed-function/application-specific integrated circuitry (ASIC) and/or configurable circuitry), a processor and memory configured with appropriate instructions, and/or combinations thereof. Adaptive classification and decision system 104 may store factors 118, information related to bins 116 (e.g., boundaries and/or contents), per bin costs 126, and/or other parameters in memory, registers, buffers, and/or circuitry.

System 100 may represent a single platform (e.g., a processor-based platform and/or a system-on-chip (SoC), and or multiple platforms (e.g., a cloud-based platform, an in-house/proprietary platform, and/or combinations thereof). ML model 102, adaptive classification and decision system 104, and process execution system 106 may be housed at a central location or may be distributed across multiple locations. ML model 102, adaptive classification and decision system 104, and process execution system 106 may be owned and/or managed by a single entity or separate entities.

Examples are provided below for an application in which dataset 110 represents a circuit design (e.g., a changelist represented as register level transfer (RTL) code), processes 114 include electronic design automation (EDA) verification tools, and predictions 112 are indicative of whether the respective EDA tools are appropriate/suitable for the IC design of dataset 110 (e.g., whether the respective EDA tools will detect a defect in the changelist). ML model 102 may include one or more machine learning (ML) models trained with a supervised training technique based on labeled historical datasets (e.g., RTL code for multiple circuit designs, labeled with outcomes of processes 114 performed on the RTL code for the respective circuit designs). System 100 is not, however, limited to circuit designs and EDA tools.

Figure 2:
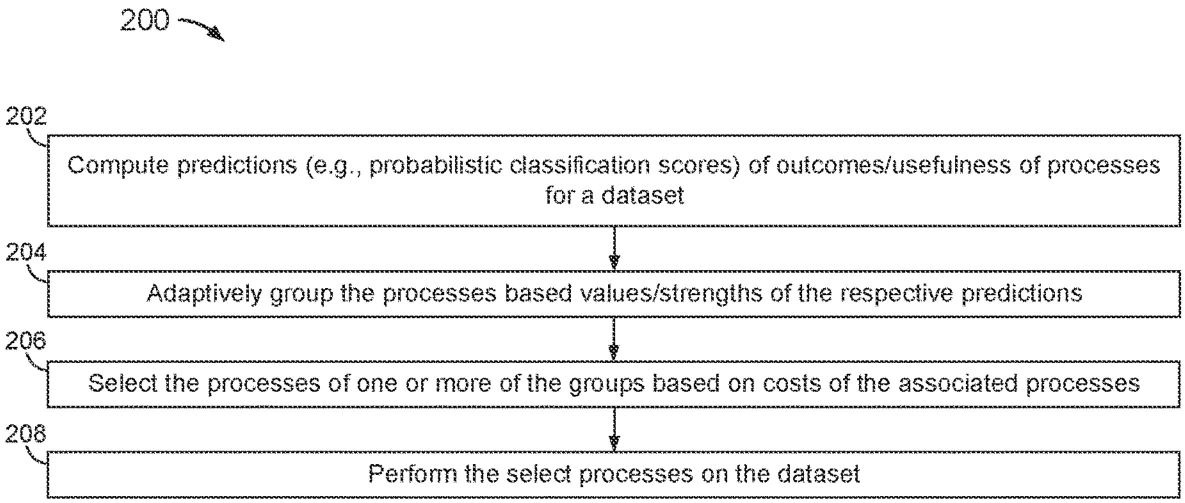
FIG. 2 is a flowchart of a method of adaptively classifying predictions, according to an embodiment.

FIG. 2 is a flowchart of a method 200 of adaptively classifying predictions, according to an embodiment. Method 200 is described below with reference to system 100. Method 200 is not, however, limited to the example of system 100.

At 202, ML model 102 computes predictions 112 regarding applicability/suitability of processes 114 for dataset 110. ML model 102 may compute predictions 112 as probabilistic classification scores for respective processes 114. ML model 102 may compute predictions 112 as floating-point scores (e.g., in a range of [0.0 . . . 1.0]). Predictions 112 may represent class membership probabilities (e.g., probabilities as to whether the respective processes 114 are suitable for dataset 110). Where dataset 110 includes a circuit design (e.g., RTL code) and processes 114 include EDA evaluation tools, predictions 112 may represent predictions as to whether the respective EDA tests will detect defects in the circuit design. In such a situation, predictions 112 may be referred to as failure scores.

Some classifiers, such as support vector machines (SVMs) and naive Bayes classifiers, do not produce probabilities directly, but instead produce scores or confidence values that are not directly interpretable as probabilities. In such a situation, ML model 102 or adaptive classification and decision system 104 may apply a calibration process to the scores or confidence values to convert them into calibrated probabilities, in which case predictions 112 may represent calibrated probabilities. A calibrated probability is a probability estimate that can be directly interpreted as the likelihood of an event to occur. In other words, a classifier says that the probability of an instance belonging to a certain class is 0.8, then in about 80% of the cases where the classifier predicts that class, the instance will belong to that class. Calibration techniques include Platt Scaling, Isotonic Regression, Temperature scaling, and others. Predictions 112 may include one of a variety of types of scores, provided that the scores conform to a monotonic probabilistic measure.

At 204, adaptive classification and decision system 104 adaptively groups/classifies predictions 112 based on values/strengths of the respective predictions 112. In FIG. 1, adaptive classification and decision system 104 groups processes 114 into n bins 116, where n is a positive integer. In an embodiment, n equals two (i.e., binary classification). Alternatively, n may be greater than two (i.e., non-binary, or multi-class classification). Adaptive classification and decision system 104 may utilize an adaptive classification method to adaptively determine and/or adjust boundaries/thresholds of bins 116 based on the values/strengths of predictions 112, examples of which are provided further below. Adaptive classification at 204 may result in relatively low variance amongst the predictions 112 within the bins 116.

In an embodiment, adaptive classification and decision system 104 discards predictions 112 that are below a prediction threshold, and may perform the adaptive grouping/classification with respect to remaining predictions 112.

At 206, adaptive classification and decision system 104 selects processes 114 associated with the predictions 112 of one or more bins 116 based on one or more metrics (e.g., factors 118), and outputs corresponding process selections 128. Adaptive classification and decision system 104 may select processes 114 associated with one or more bins 116 based on bin costs 126 computed from costs 122 of associated processes 114, a global budget 124, and/or user input 120. Adaptive classification and decision system 104 may select processes 114 associated with one or more bins 116 to balance global budget 124 and failure rates 125 based a set of metrics, such as expected prediction accuracy, or precision. Adaptive classification and decision system 104 may compute and store an expected value of recall/prediction efficiency, test reduction, and estimated bin costs 126 for each bin 116 (i.e., costs associated with running each test in a bin 116) for use in selecting processes 114.

Recall/prediction efficiency is a measure of completeness of training of ML model 102. The measure of completeness may be based on a number of tests that were predicted to fail and truly failed (true positive instances), divided by the number of correctly predicted failures (true positives), plus the number of test cases that were predicted to pass but actually failed (false negatives). A recall of 1 indicates that ML model 102 correctly predicted all failing tests, while a recall of 0 means that ML model 102 failed to predict any of the test failures. In other words, recall is a metric that provides a percentage of correctly predicted positive observations out of all the observations that were actually positive. Recall may also be referred to as sensitivity or true positive rate (TPR).

Adaptive classification and decision system 104 may evaluate bins 116 sequentially and may maintain a cumulative tally of costs of selected processes (e.g., based on a cost function defined in EQ. (1) further above). Adaptive classification and decision system 104 may select processes 114 associated with predictions of bins 116 for which the tally is closest to global budget 124 (e.g., based on metric matching from a user query through an interactive test-list selection interface). In an embodiment, adaptive classification and decision system 104 presents bins 116 and bin costs 126 to a user, and receives process selections 128 from the user.

At 208, process execution system 106 executes processes 114 indicated by process selections 128, and outputs corresponding results 130.

Figure 3:
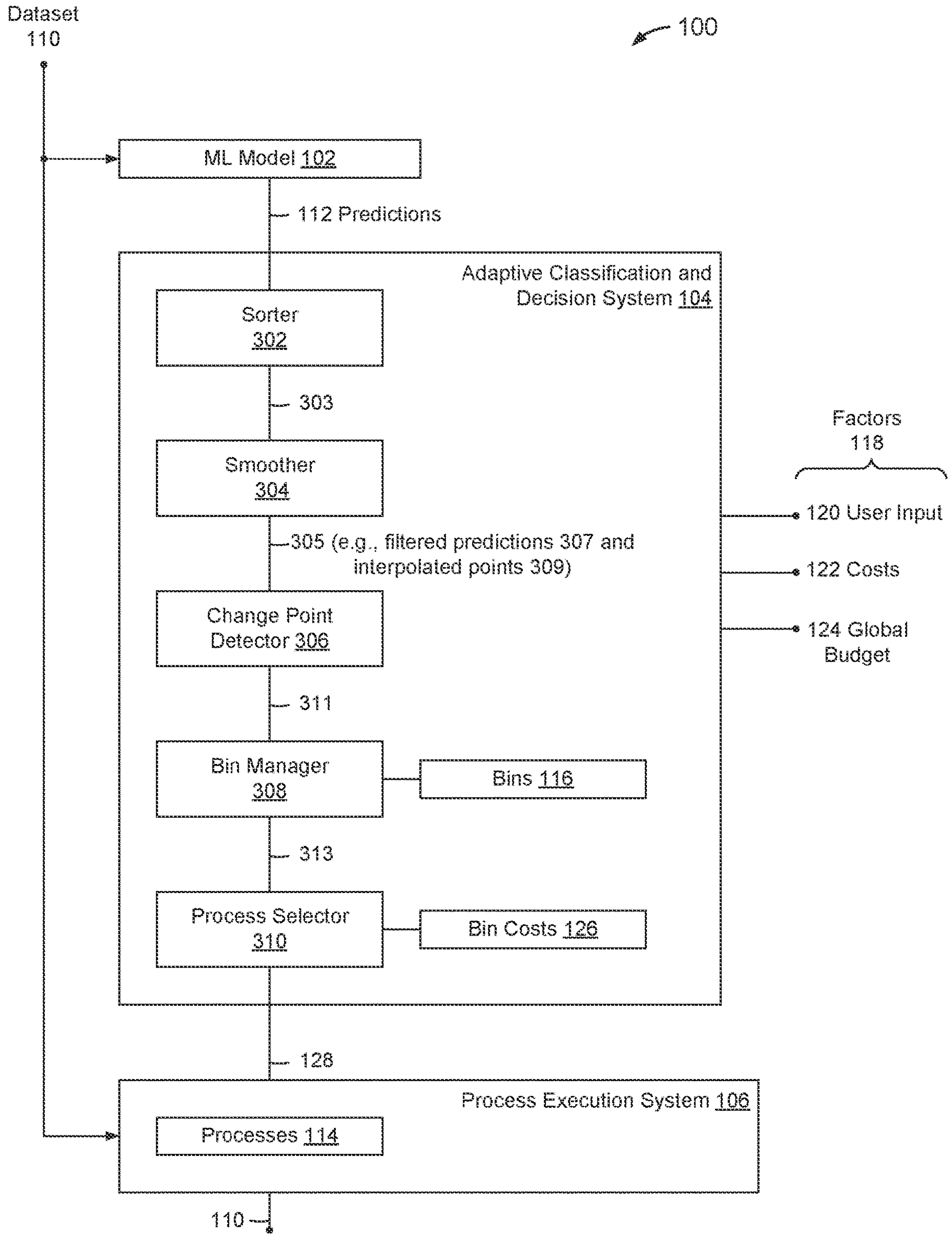
FIG. 3 is a block diagram of the system of FIG. 1 in which the adaptive classification and decision system includes a sorter, a smoother, a change point detector, a bin manager, and a process selector, according to an embodiment.

FIG. 3 is a block diagram of system 100 in which adaptive classification and decision system 104 further includes a sorter 302, a smoother 304, a change point detector 306, a bin manager 308, and a process selector 310, according to an embodiment.

Figure 4:
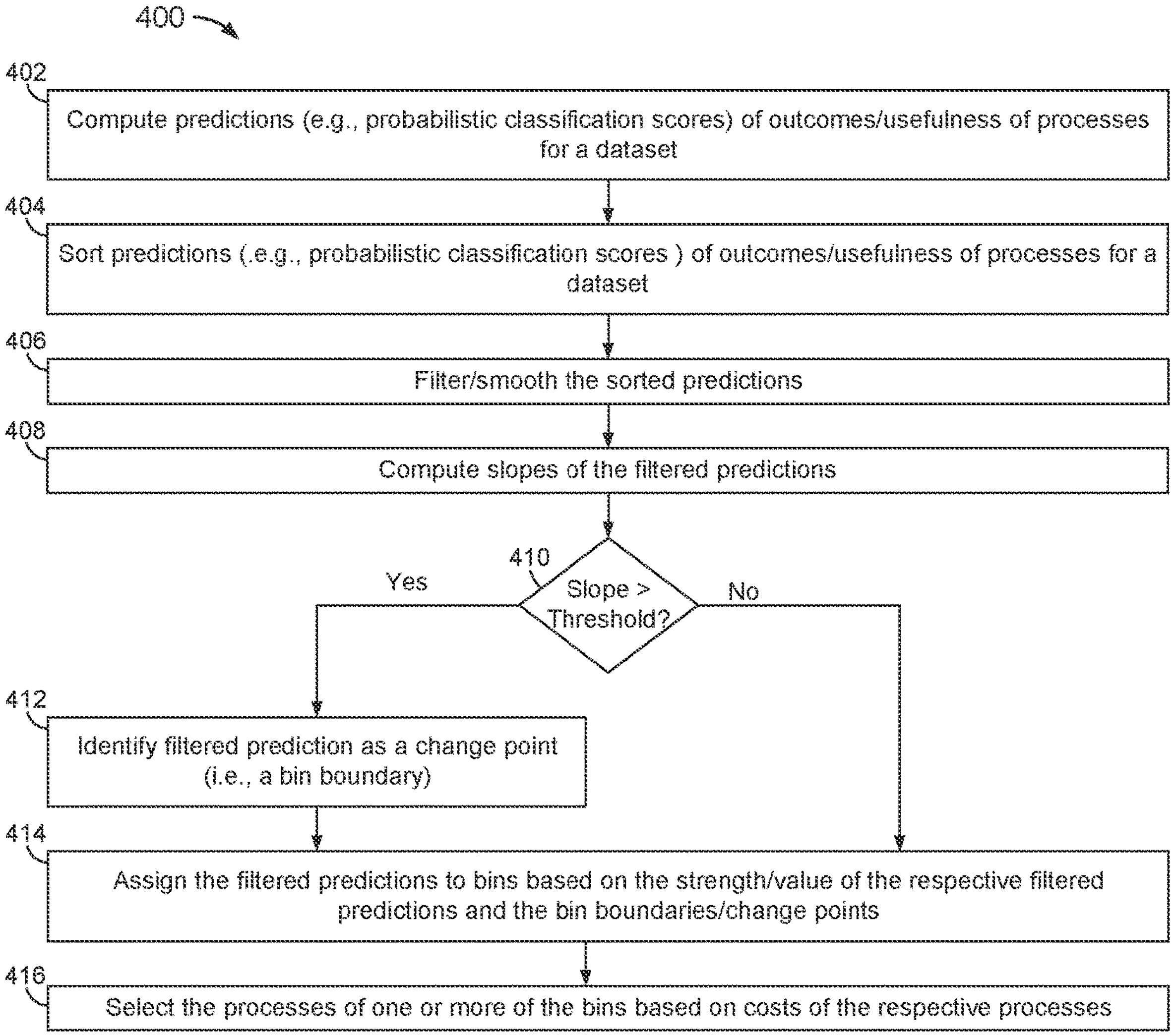
FIG. 4 is a flowchart of another method of adaptively classifying predictions, according to an embodiment.

FIG. 4 is a flowchart of a method 400 of adaptively classifying predictions, according to an embodiment. Method 400 is described below with reference to system 100. Method 400 is not, however, limited to the example of system 100.

At 402, ML model 102 computes predictions 112, such as described above with reference to 202 in FIG. 2.

At 404, sorter 302 sorts, or orders predictions 112 based on a decreasing order of the values/strengths of the predictions, to provide ordered predictions 303. Where predictions 112 include probabilistic classification scores, ordered predictions 303 may represent a discrete probability distribution curve.

As described further below with reference to 408, change point detector 306 detect changes points, or knees, in the discrete probability distribution curve based on slope changes. A challenge with discrete data is that discretization noise may lead to false knee detection. A method that uses local slope changes on a fitted curve of discrete data to detect knees will in-turn have difficulty distinguishing true knees from noise. False knee detection may be avoided or minimized with a smoothing, or filtering function as described below with reference to 406.

At 406, smoother 304 smooths, or filters ordered predictions 303 to provide filtered ordered predictions 305. Filtered ordered predictions 305 may include adjusted values/strengths of predictions 112, illustrated here as filtered predictions 307, and may further include interpolated points 309. Where ordered predictions 303 represent a discrete probability distribution curve, filtered ordered predictions 305 may represent a smoothed version of the discrete probability distribution curve. Smoother 304 may include a Savitzky-Golay filter circuitry configured to filter noise from the ordered discrete probabilistic classification scores, and second-degree polynomial curve-fit circuitry configured to interpolated data points for the filtered ordered discrete probabilistic classification scores.

At 408, change point detector 306 detects slope changes (i.e., candidate change-points) in filtered ordered predictions 305. Change point detector 306 may detect the slope changes for filtered predictions 307 based on neighboring interpolated points 509.

At 410, change point detector 306 compares the slope changes of filtered ordered predictions 305 to a rate of change threshold. For each filtered prediction 307, change point detector 306 may compute a discrete second derivative of neighboring points to provide a rate of change (i.e., slope change). If the slope change meets the rate of change threshold, at 412, change point detector 306 identifies the slope change as a candidate change point. Change point detector 306 may post-process the candidate change points to provide a final set of change points 311 that captures major change points in the discrete data. Alternatively, or additionally, bin manager 308 may post-process the candidate change points, such as described further below with reference to 414 of FIG. 4 (i.e., adjustment of bin boundaries).

Referring to 406, smoother methods may lose valuable information if the smoothing method is not properly calibrated. In an embodiment, smoother 304 generates multiple sets of filtered ordered predictions 305 (e.g., a family of smoothed curves) by computing multiple configurations of a smoothing function. Smoother 304 may employ a hyper-parameter tuning method that varies one or more parameters of the smoothing function to compute the multiple configurations of the smoothing function. The one or more parameters may include, without limitation, a window-size of the smoothing function (a Savitzky-Golay filter is sensitive to the window size and type of interpolation used during filtering). In the foregoing embodiment, change point detector 306 searches the multiple sets of filtered ordered predictions 305 for slope changes. Change point detector 306 may search the multiple configurations of the smoothing function until no additional change points are detected.

Example pseudo-code for smoother 304 is provided below.

```
Data: s: Sorted ML scores ≥ prediction cut-off
Data: w: Savitzky Golay filter window
Data: k: Sensitivity parameter
```

-continued

```
Result: chgs: viable change point indices
d''(s) ← savgol_filter(s, w);
d''(s)_min ← max(abs(d''(s)))/k;
chg ← indices(d''(s)) where d''(s) ≥ d''(s)_min;
return chg;
```

Example pseudo-code for change point detector 306 is provided below.

```
Data: s: Sorted ML scores ≥ prediction cut-off
Data: s[illegible]: minimum bin size
Result: opt_changes: optimal change point indices
W ← [3 : w_max];
K ← [3 : k_max];
changes, opt_changes ← θ;
for < w, k >ϵ W, K do
 | c' ← change_points(s, w, k);
 | if c' ϵ changes then
 |  |  break;
 | else
 |  |  changes ← changes ∪ c';
 | end
end
opt_changes ← merge(changes, s[illegible]);
return opt_changes;
```

At 414, bin manager 308 defines the boundaries of bins 116 based on change points 311 identified at 412. In other words, bin manager 308 uses change points 311 as implicit boundaries of bins 116. Bin manager 308 assigns filtered predictions 307 to bins 116 based on the values/strengths of the respective filtered predictions 307.

Bin manager 308 may adaptively adjust the boundaries of bins 116 based on one or more criteria. Bin manager 308 may, for example, merge a bin that does not meet a minimum size criterion (e.g., 1% of a total number of predictions 112), with an adjacent bin, until all bins 116 meet the minimum size criterion.

At 416, process selector 312 selects one or more processes 114 associated filtered predictions 307 of one or more bins 116 based on one or more factors 118, such as described above with respect to 208 in FIG. 2 and/or as described in one or more examples further below.

Figure 5:
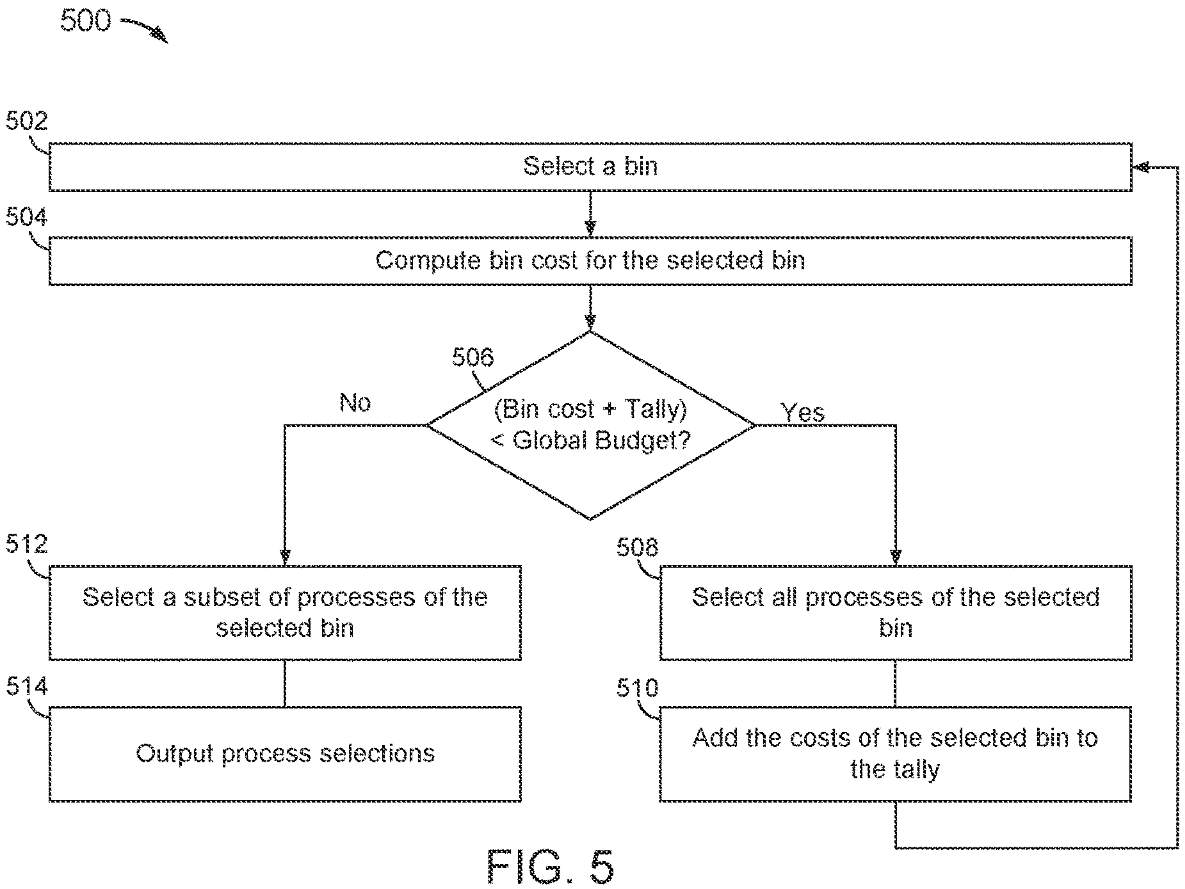
FIG. 5 is a flowchart of a method of selecting processes (e.g., EDA processes) associated with predictions assigned to one or more bins, according to an embodiment.

FIG. 5 is a flowchart of a method 500 of selecting processes associated with predictions assigned to one or more bins, according to an embodiment. Method 500 is described below with reference to system 100. Method 500 is not, however, limited to the example of system 100.

At 502, process selector 310 selects a bin 116. Process selector 310 may select bins 116 in a sequential manner, beginning with a bin for which the assigned filtered predictions 307 have the greatest values/strengths.

At 504, adaptive classification and decision system 104 computes a bin cost 126 for the selected bin 116 based on costs 122 of the associated processes 114.

At 506, process selector 310 computes a sum of the bin cost 126 computed at 504 and a tally of costs of previously selected processes 114, and compares the sum to global budget 124. In a first iteration of method 500, the tally may be zero.

At 508, if the sum computed at 506 is less than global budget 124, process selector 310 selects the processes 114 associated with the filtered predictions 307 assigned to the selected bin. Selection at 508 may be referred to as a greedy selection method.

At 510, process selector 310 adds the bin cost 126 computed at 504 to the tally and returns to 502 for selection of additional processes 114.

At 512, if the sum computed at 506 exceeds global budget 124, process selector 310 selects processes 114 associated with a subset of the filtered predictions 307 assigned to the selected bin to avoid exceeding global budget 124. In an embodiment, for each filtered prediction 307 of the selected bin 116, process selector 310 computes a sum of the cost 122 of the corresponding process 114 and the tally, and compares the sum to global budget 124. If the sum does not exceed global budget 124, process selector 310 selects the corresponding process 114 and adds the associated costs 122 to the tally. In another embodiment, process selector 310 selects the processes 114 associated with a subset of the filtered predictions 307 based on a decreasing density method, examples of which are provided further below.

At 514, process selector 312 outputs process selections 128 based on processes 114 selected at 508 and 512.

Figure 6:
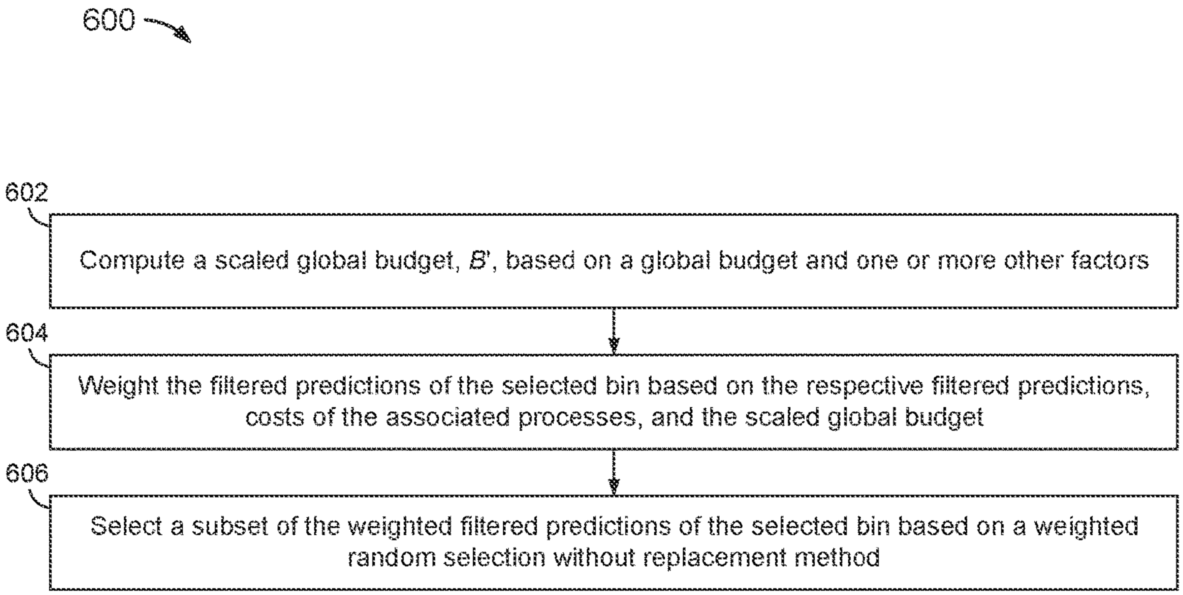
FIG. 6 is a flowchart of a method of selecting processes associated with a subset of predictions of a bin based on decreasing density, according to an embodiment.

FIG. 6 is a flowchart of a method 600 of selecting processes associated with a subset of predictions of a bin based on decreasing density, according to an embodiment. Method 600 may represent an example embodiment of 512 in FIG. 5. Method 600 may be useful where adaptive classification and decision system 104 discards predictions 112 that are below the dynamically computed threshold described above with respect to 204 in FIG. 2. Method 600 is described below with reference to system 100. Method 600 is not, however, limited to the example of system 100.

At 602, adaptive classification and decision system 104 computes a scaled global budget, B', for a selected bin 116 based on global budget 124 and one or more other factors. In an embodiment, adaptive classification and decision system 104 computes scaled global budget B' based on global budget 124 and a sum of filtered predictions 307 of the selected bin, such as illustrated in EQ. (3).

$$B' = \frac{B}{\sum_{j=0}^{|P|} p_j} \qquad \text{EQ. (3)}$$

where:

B represents global budget 124; and $$\sum_{j=0}^{|P|} p_j$$

represents the sum of all filtered predictions 307 (for a situation in which adaptive classification and decision system 104 previously discarded predictions 112 that are below the dynamically computed threshold described further above).

In another embodiment, adaptive classification and decision system 104 computes the scaled global budget B' based on global budget 124, a tally of costs of previously selected processes 114, and a sum of filtered predictions 307 of the selected bin, such as illustrated in EQ. (4).

$$B' = \frac{B - \text{Tally}}{\sum_{j=0}^{|P|} p_j} \qquad \text{EQ. (4)}$$

where:

B represents global budget 124;

Tally represents a sum of costs 122 of previously selected processes 114; and $$\sum_{j=0}^{|P|} p_j$$

represents the sum of filtered predictions 307 of the selected bin (for a situation in which adaptive classification and decision system 104 previously discarded predictions 112 that are below the score threshold described further above).

At 604, adaptive classification and decision system 104 weights the filtered predictions 307 of the selected bin 116 based on values of the respective filtered predictions 307, costs of the associated processes 114, and scaled global budget B'. Adaptive classification and decision system 104 may weight the filtered predictions 307 based on EQ. (4).

$$w_i(p_i) = \frac{p_i \cdot c_i}{B'} \qquad \text{EQ. (4)}$$

where:

$p_i$ represents the filtered predictions 307 of the selected bin 116; and $c_i$ represents costs 122 of the associated processes 114; and B' is the scaled global budget.

Intuitively, $w_i(p_i)$ represents a fraction of the cost 122 of a process 114 relative to global budget 124, weighted by the predicted probability of the corresponding filtered prediction 307 being in a particular class, or bin 116.

At 606, process selector 310 selects a subset of the weighted filtered predictions of the selected bin 116 based on a weighted random selection without replacement method, such that a filtered prediction 307 with higher weight has a higher chance of selection. Selection may be proportional to:

$$\frac{w_i}{\sum_{j=0}^{|P|} p_j}$$

from EQ. (3). Method 600, in combination with method 500, may be referred to as decreasing density, weighted random selection without replacement based adaptive classification and decisioning.

Figure 7:
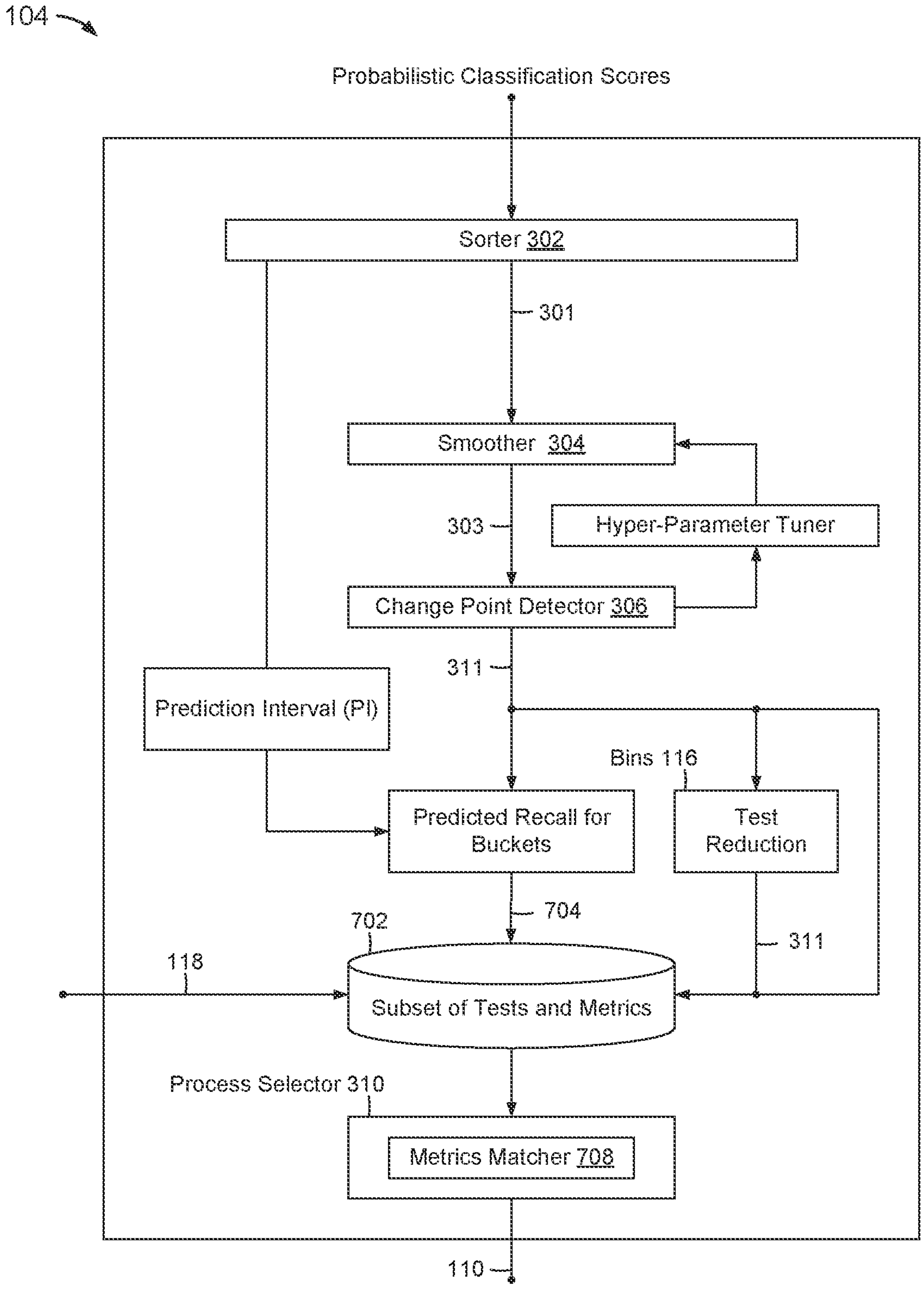
FIG. 7 is another block diagram of the adaptive classification and decision system, according to an embodiment.

FIG. 7 is a block diagram of adaptive classification and decision system 104, according to an embodiment. In the example of FIG. 7, adaptive classification and decision system 104 includes features described in one or more examples above, and further includes storage circuitry 702 that stores metrics for process selector 310 (e.g., change points 311, bin contents 313, predicted recall 704 for bins 116, and factors 118). In FIG. 7, process selector 310 includes a metric matcher 708 that selects processes 114 associated with one or more bins 116 to balance global budget 124 with one or metrics stored in storage circuitry 702.

Experimental Results

Experimental results are provided below with respect to predictions 112 from a commercial online classifier for RTL regression tests (i.e. ML model 102), Intelligent Test Selection (ITS), optimized with an adaptive classification and decision system 104, as disclosed herein. ITS employs machine learning to calculate the probability that an EDA test will find a defect caused by a certain code modification. Using these estimations, adaptive classification and decision system 104, a smaller set of tests is developed that has a high probability of identifying latent defects caused by the modification.

Techniques disclosed herein have been validated on various changelists (CLs) of three designs, denoted D1, D2 and D.

D1 is a large custom intellectual property (IP) block to be integrated in a larger system-on-a-chip (SoC). This includes 100% constrained random tests with 46 unique tests with seed ranges from [2, 950], and total test count are distributed from [3389, 15011] across different CLs.

D2 has a wide range of high-end characteristics seen in most contemporary microprocessors and is highly re-configurable. In this instance, validation engineers hand-select a combination of directed and constrained random tests for regressions based on the current stage of the design process.

D3 is a data and control-intensive soft IP block that is configurable and supports several design-under-test (DUT) configurations. The regression suite is a set of restricted random tests to verify IP integration in customer SOCs.

ITS was run on three designs D1, D2, and D3 that have a mix of directed and a reasonable number of random test cases. Given a set of RTL tests of (approximately) fixed size that are run periodically, ITS predicts tests that have high likelihood of failure.

Figure 8A:
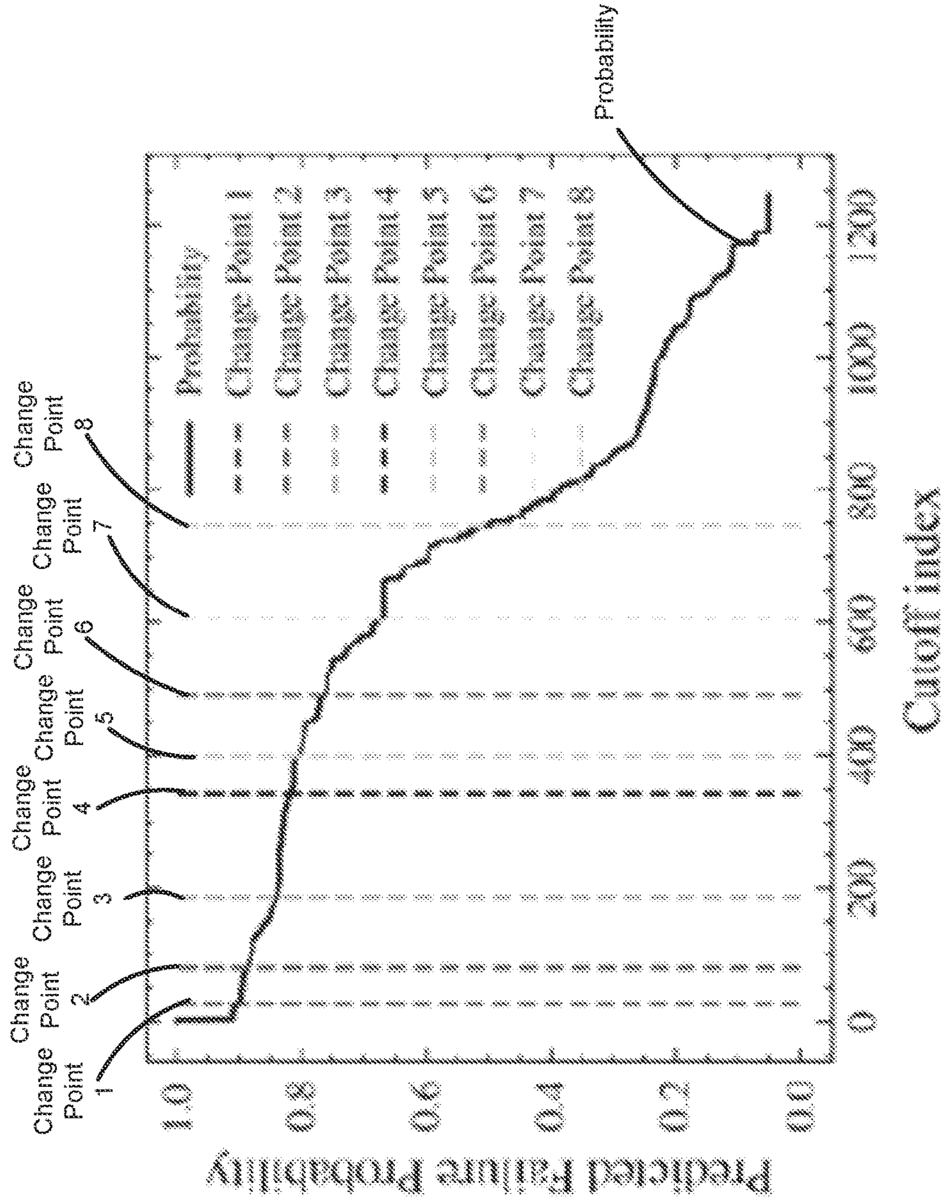
FIG. 8A is a graph of change points detected by an experimental adaptive classification and decision system for a first changelist (CL) of a circuit design D2.
Figure 8B:
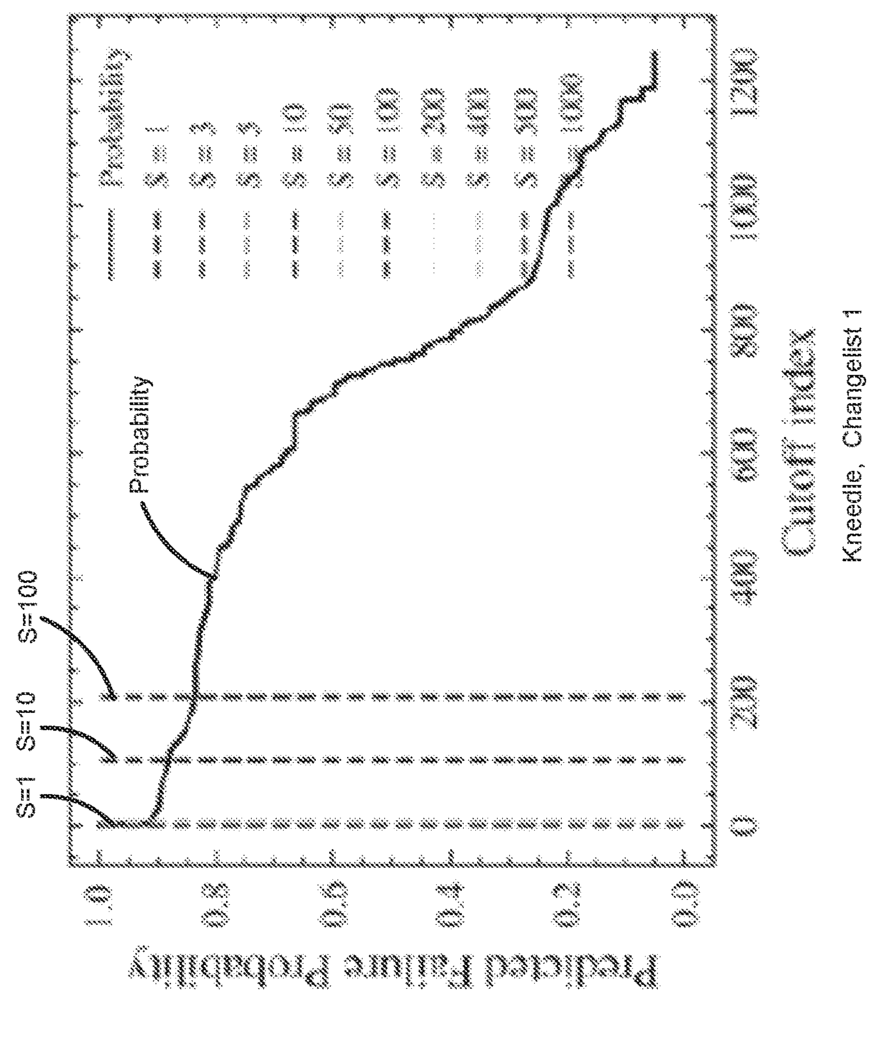
FIG. 8B is a graph of change points detected by a Kneedle approach for the first changelist (CL) of circuit design D2.
Figure 8C:
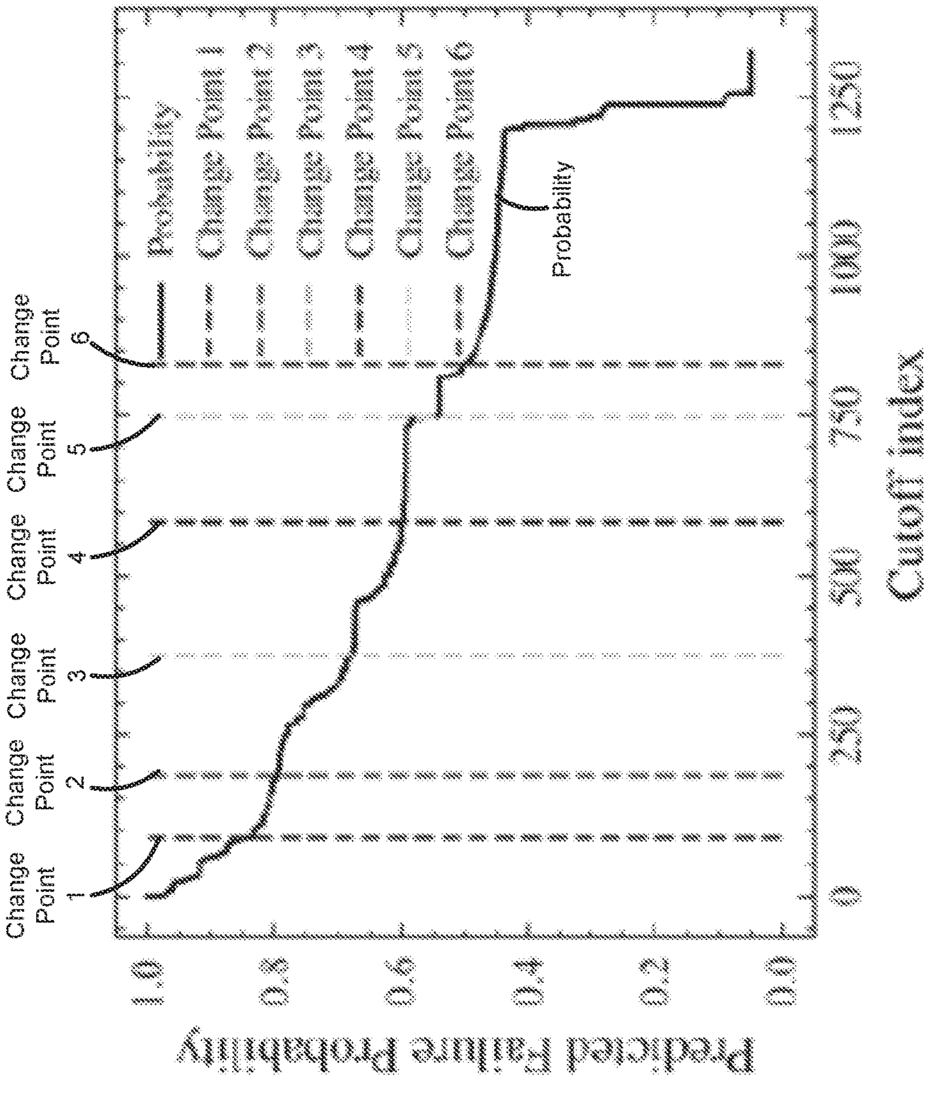
FIG. 8C is a graph of change points detected by the experimental adaptive classification and decision system for a second changelist (CL) of circuit design D2.
Figure 8D:
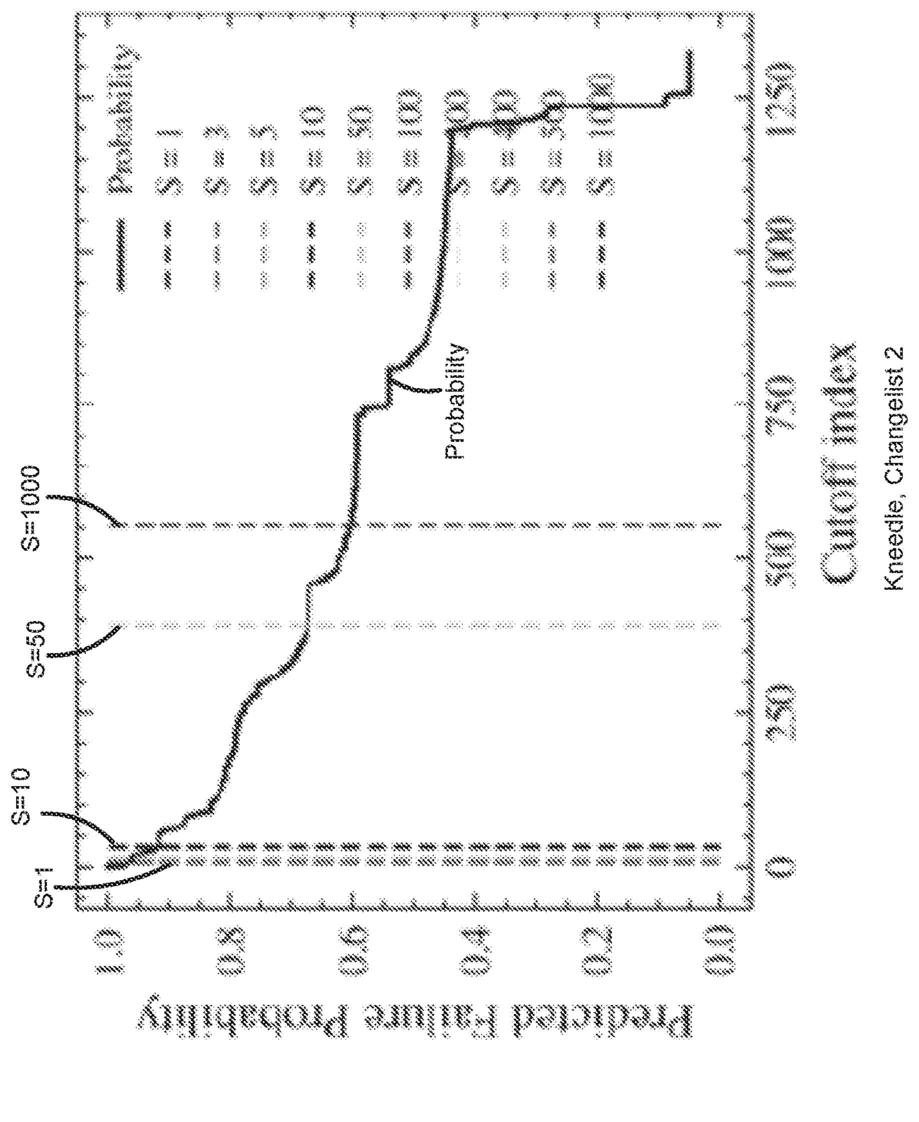
FIG. 8D is a graph of change points detected by the Kneedle approach for the second changelist (CL) of circuit design D2.

A comparative analysis was performed between techniques disclosed herein and a Kneedle approach to detect fine grain changes in probability scores. FIGS. 8A through 8D illustrate respective graphs 800, 802, 804, and 806, to illustrate a comparison of the two approaches on two different CLs of design D2. FIG. 8A illustrates that techniques disclosed herein detected 8 change points at different cut-off indexes, whereas FIG. 8B illustrates that Kneedle detected only four distinct change points (knee index) with varying values on sensitivity parameter.

Figure 9B:
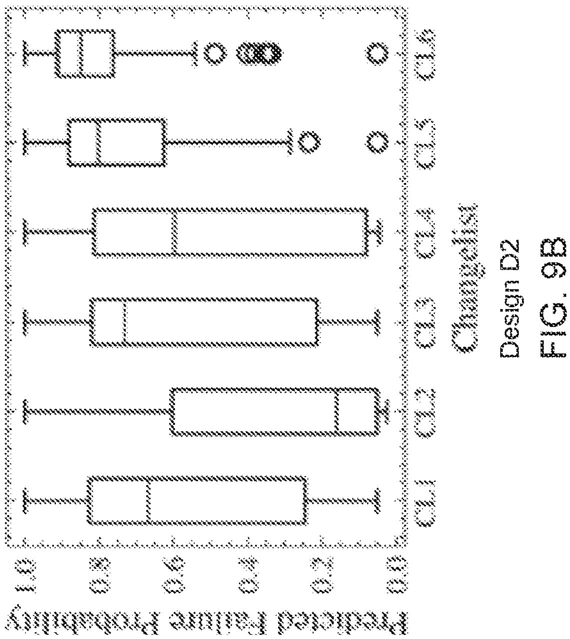
FIG. 9B is a graph that illustrates failure probability distribution generated from the ITS classification model for six CLs of circuit design D2.
Figure 9A:
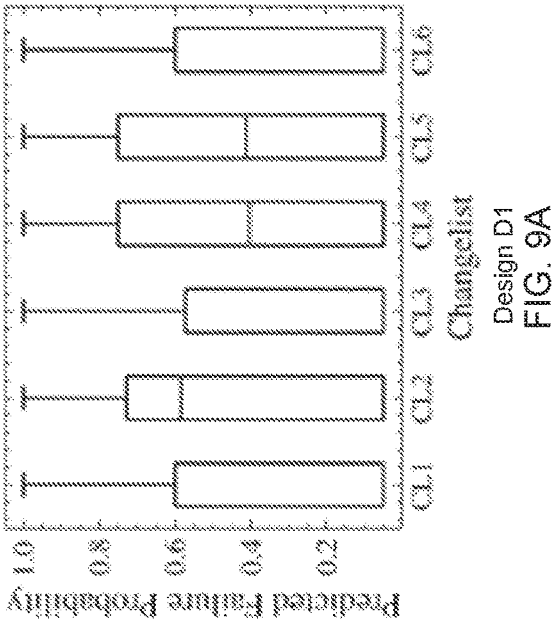
FIG. 9A is a graph that illustrates failure probability distribution generated from an Intelligent Test Selection (ITS) classification model for six CLs of a circuit design D1.
Figure 9C:
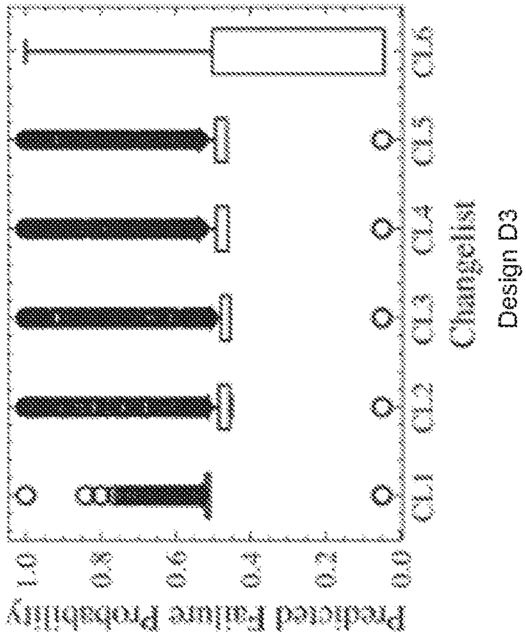
FIG. 9C is a graph that illustrates failure probability distribution generated from the ITS classification model for six CLs of a circuit design D3.

FIGS. 9A through 9C illustrate respective graphs 900, 902, and 904, to illustrate variation of failure probability distribution generated from the ITS classification model for six CLs. Change point detection techniques disclosed herein are used to find the best possible bins and provide different options to trade-off between prediction efficiency and test reduction. The objective is to optimize the total cost, discussed further above, given the resource and budget constraints.

Figure 10B:
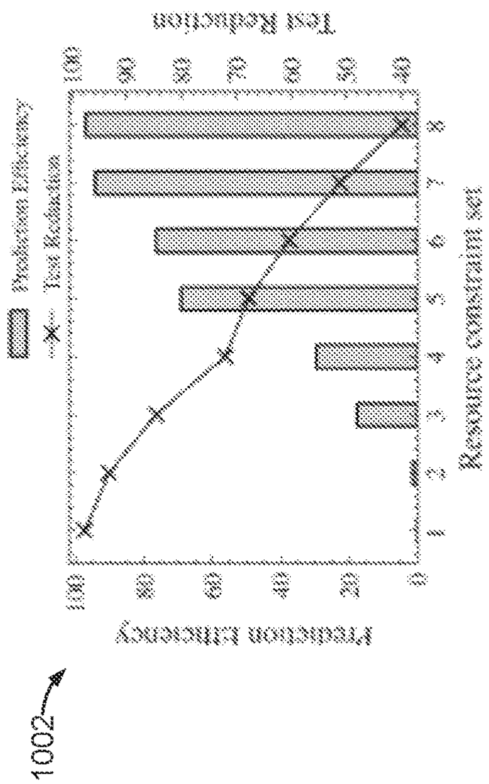
FIG. 10B is a graph of prediction efficiency versus resource constraints for circuit design D2.
Figure 10A:
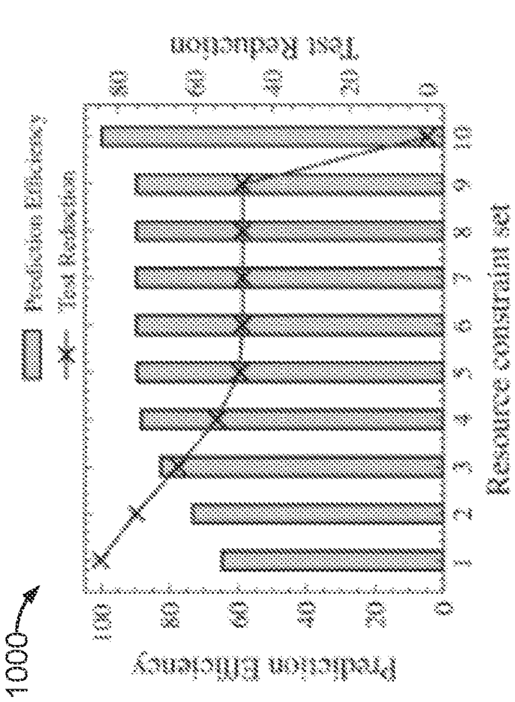
FIG. 10A is a graph of prediction efficiency versus resource constraints for circuit design D1.
Figure 10C:
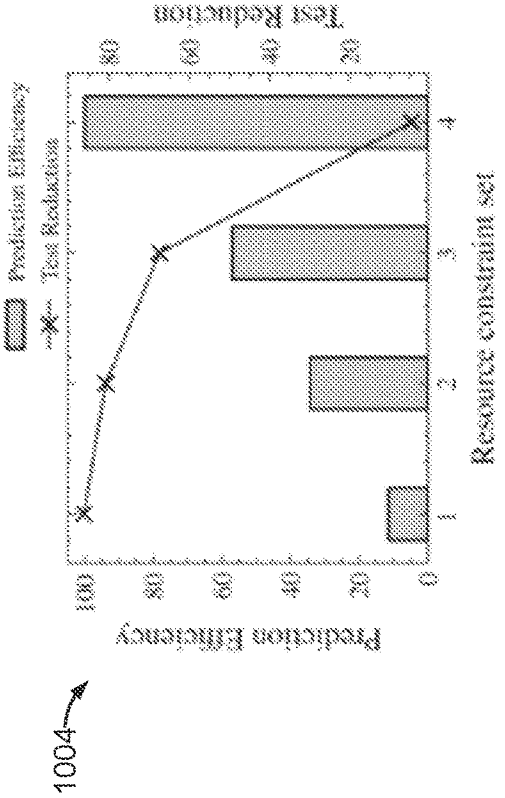
FIG. 10C is a graph of prediction efficiency versus resource constraints for circuit design D3.

FIGS. 10A through 10C illustrate respective graphs 1000, 1002, and 1004 of results obtained from techniques disclosed herein on designs D1, D2 and D3. In FIGS. 10A and 10B, using techniques disclosed herein to separate the predicted test lists of ITS into different bins based on recall or prediction efficiency and test reduction metrics. Moreover, boundary points can be found for optimized decision-making in terms of prediction efficiency and test reduction for all three designs. FIG. 10C illustrates that techniques disclosed herein can be used to aid users in bin selection or budgeting for corner cases when the number of change points are very limited. A user may be provided with an option to configure the budget ahead of regression runs so that ITS can select a bin with appropriate prediction efficiency and a reduced set of tests to always meet the resource budget constraint.

The experiments were run on a single CentOS virtual machine (VM) with ITS installation. The table below shows hardware details of the VM used for the experiments and it also presents the average ITS model training time, prediction time and binning time. The model training time is directly proportional to the size of the design, prediction time includes a combination of feature generation and inference time, and the average binning time that uses techniques disclosed herein is below 0.1 second. Regression runs were compared with and without the disclosed techniques to evaluate the impact of the disclosed techniques on the QOR of ITS predictions.

| Performance Metrics | DI | D2 | D3 |
|---|---|---|---|
| Average model training time | 64.06 s | 53.67 s | 48.09 s |
| Average prediction time | 155.54 s | 149.13 s | 152.24 s |
| Average binning time | 0.053 s | 0.028 s | 0.031 s |

| Hardware Details (Single VM) | |
|---|---|
| OS | CentOS 7.6 |
| Kernel Version | 3.10.0-1127.10.1.el7.x86_64 |
| CPU | 19 |
| Memory | 360 GB |
| Storage | 400 GB |

The table below shows a comparison between regular ITS predictions and ITS predictions after obtaining the optimized predicted test list using techniques disclosed herein. For comparison purposes, an $(n-1)^{th}$ probability bin is used, which is the first bin before the ML classifier threshold.

Average Prediction Results Comparison

| Metrics | D1 | D2 | D3 |
|---|---|---|---|
| Total Tests | 8000 | 1300 | 1100 |
| Percentage of Random Tests | 100% | 3% | 4% |
| Avg test reduction (w/o opt.) | 33% | 33% | 61% |
| Avg test reduction (with opt.) | 48% | 35% | 61% |
| Avg prediction efficiency (w/o opt.) | 92% | 97% | 92% |
| Avg prediction efficiency (with opt.) | 89% | 94% | 92% |

(w/o opt): Normal predictions without optimization
(with opt): Normal predictions with optimization Design D1 has 100% random tests (~8000) where the number of seeds is distributed over a wide range of [2, 950]. Design D2 has only 3% random tests (out of ~1300 total tests) where the number of seeds is distributed in range of [2, 50] but highly skewed within the range of [2, 10]. Design D3 has only 4% random tests (out of ~1100 total tests) where the number of seeds is distributed in range of [3, 5]. Design D1 is representative of regressions with fully random tests whereas design D2 and D3 are good representations of regressions with a majority of directed tests and a small number of random tests. In design D1, an expected improvement of 15% was observed in average test reduction and a small dip of 3% in average prediction efficiency while comparing the results with and without the disclosed optimization techniques. In design D2, a minor improvement of 2% was observed in average test reduction and a small dip of 3% in average prediction efficiency. In design D3, no change was observed in average test reduction and average prediction efficiency as expected.

Hence, techniques disclosed herein provide improvement in test reduction on regressions with a significant fraction of random tests while taking a relatively small dip in prediction efficiency. Moreover, the disclosed techniques have negligible effect on regressions with a very low percentage of random tests or when the number of runs per random test is very small.

Other possible approaches for dealing with imbalanced datasets include resampling methods to balance the class distribution prior to training, and threshold moving methods that change the default threshold after training to meet some defined metric (e.g., precision, accuracy, or F1 scores). Re-sampling may suffer from loss of informative data for undersampling-based methods, changes in data properties that cause models to have biased results, and heuristic or blind methods to choose class distributions to use for a given dataset and a target performance metric. Threshold moving methods may be generally less aggressive than resampling methods and may have fewer negative effects but are generally hard to tune for the best QoR in a dynamic cost environment.

Small, imbalanced training data-sets may result in highly variable model QoRs amongst prediction sets. Almost all customers operate in resource-constrained environments whether using on premise data-centers or cloud compute. Techniques disclosed herein may be useful to maximize quality of results while minimizing resource costs.

Figure 11:
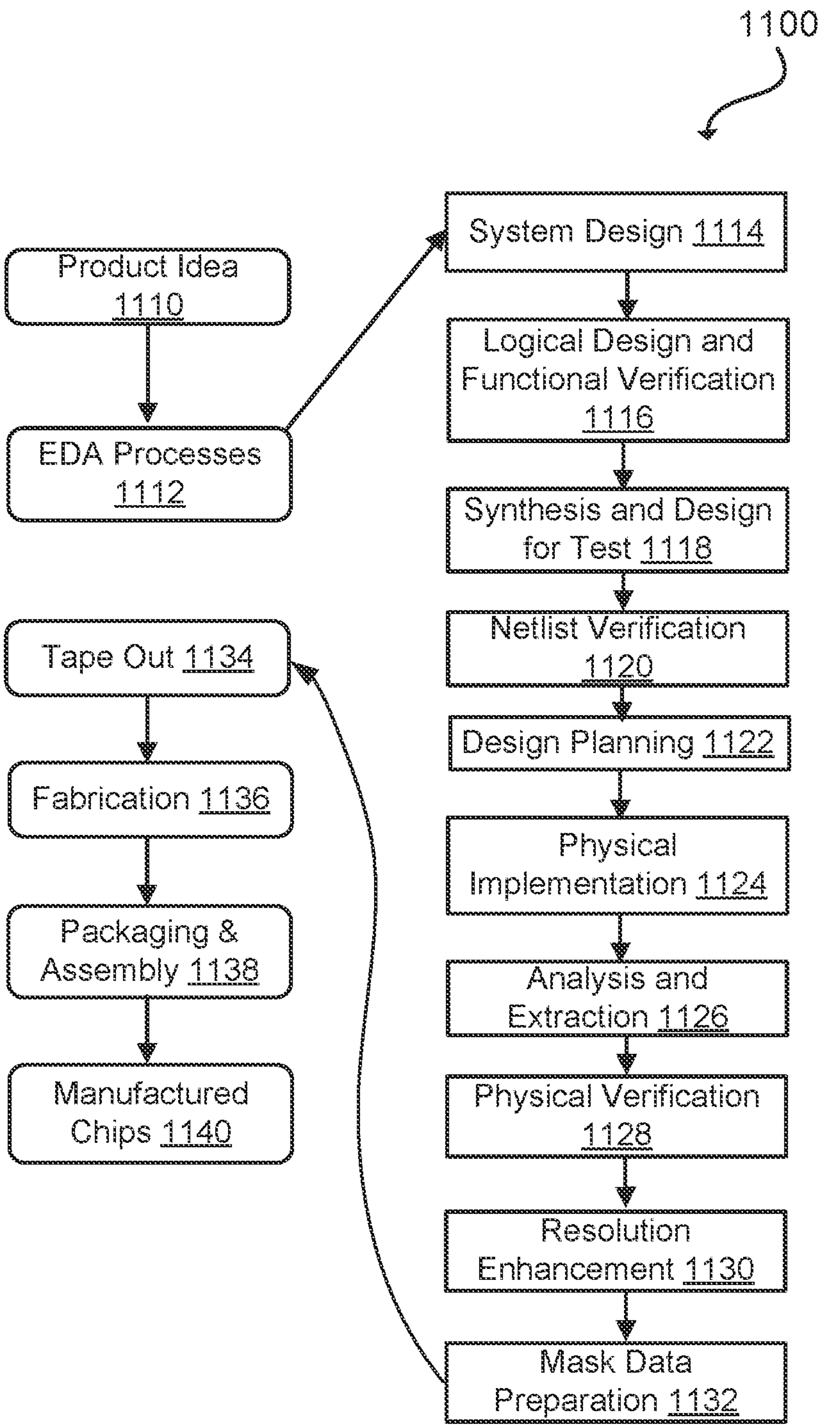
FIG. 11 depicts a flowchart of various processes used during the design and manufacture of an integrated circuit in accordance with some embodiments of the present disclosure.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 11. The processes described by be enabled by EDA products (or EDA systems).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as a computer system 1200 of FIG. 12) may be used to store the programs and data structures that are used by some or all of the EDA products described herein, and products used for development of cells for the library and for physical and logical design that use the library.

Figure 12:
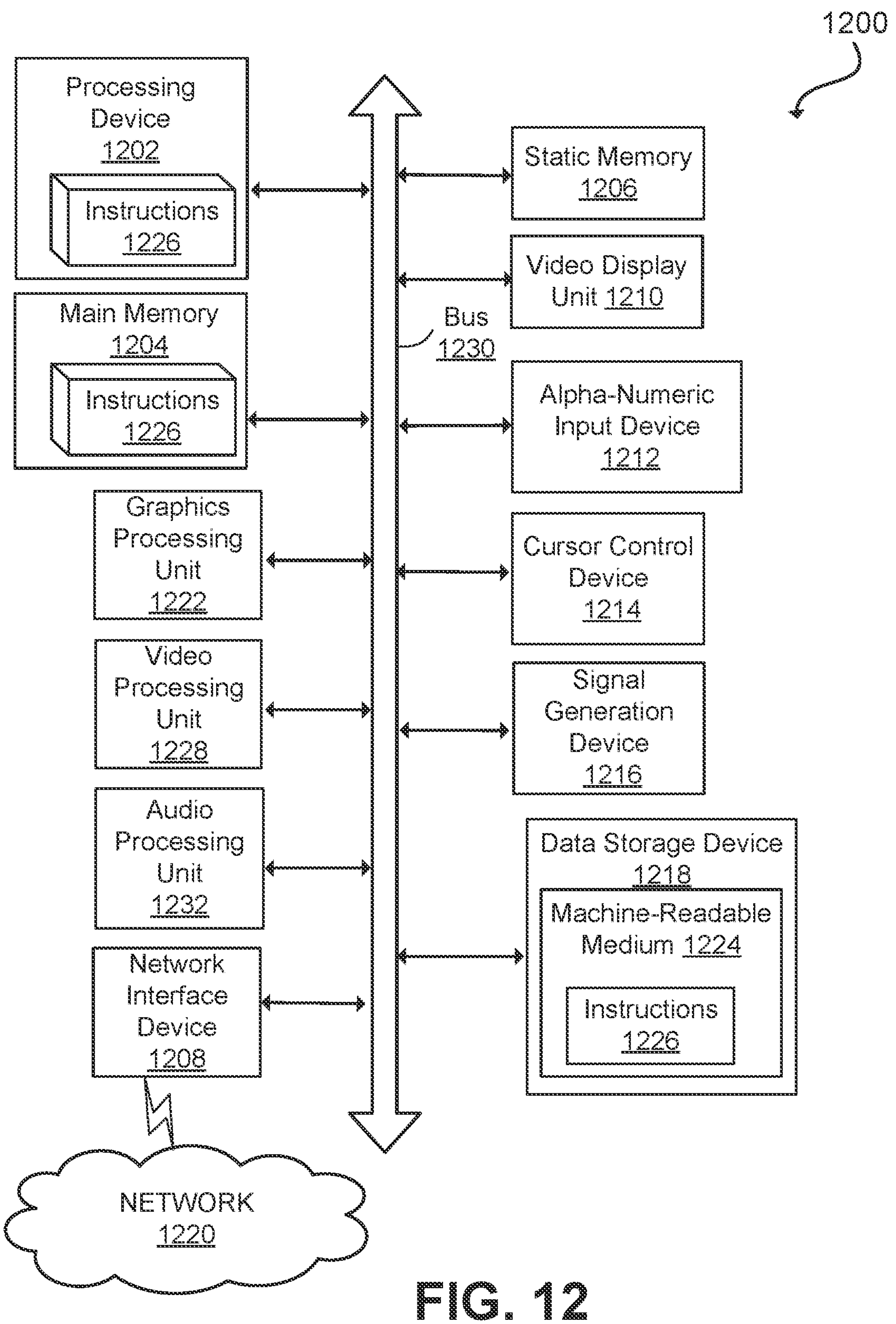
FIG. 12 depicts a diagram of an example computer system in which embodiments of the present disclosure may operate.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A non-transitory computer readable medium encoded with a computer program that comprises instructions to cause a processor to:

compute a set of bin thresholds based on slope changes in an ordered set of discrete probabilistic classification scores, wherein the discrete probabilistic classification scores reflect machine-learning-generated probabilities that corresponding circuit design evaluation processes will detect a defect in a circuit design;

assign the circuit design evaluation processes to the bins based on values of the discrete probabilistic classification scores and the bin thresholds; and select a subset of the circuit design evaluation processes from one or more of the bins, for evaluating the circuit design, based on metrics associated with the respective circuit design evaluation processes.

2. The non-transitory computer readable medium of claim 1, wherein the metrics associated with the circuit design evaluation processes comprise one or more of time-to-results and financial costs associated with the circuit design evaluation processes.

3. The non-transitory computer readable medium of claim 1, wherein the computer program further comprises instructions to cause the processor to:

smooth the ordered discrete probabilistic classification scores; and compute the bin thresholds by computing the slope changes in the smoothed ordered discrete probabilistic classification scores and selecting a subset of the slope changes as the bin thresholds based on a change-point threshold.

4. The non-transitory computer readable medium of claim 3, wherein the computer program further comprises instructions to cause the processor to:

smooth the ordered discrete probabilistic classification scores with multiple configurations of a smoothing function to generate multiple sets of smoothed ordered discrete probabilistic classification scores; and compute the bin thresholds by computing the slope changes in the multiple sets of smoothed ordered discrete probabilistic classification scores.

5. The non-transitory computer readable medium of claim 1, wherein the computer program further comprises instructions to cause the processor to:

select the circuit design evaluation processes based a decreasing density function.

6. The non-transitory computer readable medium of claim 1, wherein the computer program further comprises instructions to cause the processor to evaluate the bins consecutively, starting with a bin corresponding to a highest one of the discrete probabilistic classification scores, including to, for each of the bins:

compute a bin metric based on the metrics associated with the circuit design evaluation processes of the bin;

select all of the circuit design evaluation processes of the bin if a sum of the bin metric and a tally of bin metrics of previously selected circuit design evaluation processes is below a selection threshold; and select a subset of the circuit design evaluation processes of the bin if the sum exceeds the selection threshold.

7. The non-transitory computer readable medium of claim 6, wherein the computer program further comprises instructions to cause the processor to:

select the subset of the circuit design evaluation processes of the bin based on weighted random selection without replacement.

8. The non-transitory computer readable medium of claim 6, wherein the computer program further comprises instructions to cause the processor to:

select the discrete probabilistic classification scores from an initial set of discrete probabilistic classification scores based on a minimum score threshold;

order the selected discrete probabilistic classification scores to provide the ordered set of discrete probabilistic classification scores;

compute the selection threshold as a sum of the metrics associated with circuit design evaluation processes associated with the initial set of discrete probabilistic classification scores;

compute a scaled selection threshold based on the selection threshold and a sum of values of the ordered set of discrete probabilistic classification scores; and weighting the circuit design evaluation processes of the bin based on values of the respective discrete probabilistic classification scores, the metrics associated with the respective circuit design evaluation processes, and the scaled selection threshold to provide weighted circuit design evaluation processes; and select the subset of the circuit design evaluation processes based on the weighted circuit design evaluation processes and weighted random selection without replacement.

9. The non-transitory computer readable medium of claim 1, wherein the computer program further comprises instructions to cause the processor to:

merge a first one of the bins with an adjacent one of the bins based on a minimum bin size threshold.

10. An integrated circuit (IC) device, comprising:

smoothing circuitry configured to smooth a set of ordered discrete probabilistic classification scores to generate a set of smoothed ordered discrete probabilistic classification scores, wherein the set of ordered discrete probabilistic classification scores reflect machine-learning-generated probabilities that corresponding circuit design evaluation processes will detect a defect in a circuit design;

change point detection circuitry configured to compute slope changes in the set of smoothed ordered discrete probabilistic classification scores and select a subset of the slope changes as bin boundaries based on a change-point threshold;

binning circuitry configured to assign the circuit design evaluation processes to the bins based on values of the discrete probabilistic classification scores and the bin boundaries; and selection circuitry configured to select a subset of the circuit design evaluation processes from one or more of the bins, for evaluating the circuit design, based on metrics associated with the respective circuit design evaluation processes.

11. The IC device claim 10, wherein:

the smoothing circuitry is further configured to smooth the ordered discrete probabilistic classification scores with multiple configurations of a smoothing function to generate multiple sets of smoothed ordered discrete probabilistic classification scores; and the change point detection circuitry is further configured to compute the slope changes in the multiple sets of smoothed ordered discrete probabilistic classification scores and select a subset of the slope changes in the multiple sets of smoothed ordered discrete probabilistic classification scores as the bin boundaries based on the change-point threshold.

12. The IC device claim 10, wherein the smoothing circuitry comprises:

Savitzky-Golay filter circuitry configured to filter noise from the ordered discrete probabilistic classification scores; and second-degree polynomial curve-fit circuitry configured to interpolated data points for the filtered ordered discrete probabilistic classification scores.

13. The IC device claim 10, wherein the change point detection circuitry comprises:

circuitry configured to compute a discrete second derivative of neighboring points of the filtered ordered discrete probabilistic classification scores.

14. The IC device of claim 10, wherein the metrics associated with the circuit design evaluation processes comprise one or more of time-to-results and financial costs associated with the circuit design evaluation processes.

15. The IC device of claim 10, wherein the binning circuitry is further configured to:

merge one of the bins with an adjacent one of the bins based on a minimum bin size criterion.

16. A method, comprising:

adaptively binning an ordered set of discrete probabilistic classification scores based on slope changes in the ordered set of discrete probabilistic classification scores, wherein the discrete probabilistic classification scores reflect machine-learning-generated probabilities that corresponding circuit design evaluation processes will detect a defect in a circuit design;

evaluating the bins consecutively, starting with a bin for which the assigned discrete probabilistic classification scores have the highest values, wherein the evaluating comprises, for each of the bins:

computing a bin metric for the bin based on the metrics of the circuit design evaluation processes of the bin;

selecting all of the circuit design evaluation processes of the bin if a sum of the bin metric and a tally of bin metrics of previously selected circuit design evaluation processes is below a selection threshold; and selecting a subset of the circuit design evaluation processes of the bin if the sum exceeds the selection threshold.

17. The method of claim 16, wherein the selecting the subset of the circuit design evaluation processes comprises:

selecting the subset of the circuit design evaluation processes based on a weighted random selection without replacement function.

18. The method of claim 16, further comprising:

selecting the discrete probabilistic classification scores from an initial set of discrete probabilistic classification scores based on a minimum score threshold;

ordering the selected discrete probabilistic classification scores to provide the ordered set of discrete probabilistic classification scores;

computing the selection threshold as a sum of the metrics of the circuit design evaluation processes associated with the initial set of discrete probabilistic classification scores; and computing a scaled selection threshold based on the selection threshold and a sum of values of the ordered set of discrete probabilistic classification scores.

19. The method of claim 18, wherein the selecting the subset of the processes comprises:

weighting the circuit design evaluation processes of the bin based on the respective discrete probabilistic classification scores, the metrics of the respective circuit design evaluation processes, and the scaled selection threshold to provide weighted circuit design evaluation processes; and selecting the subset of the circuit design evaluation processes based on the weighted circuit design evaluation processes and weighted random selection without replacement.

20. The method of claim 16, further comprising:

merging one of the bins with an adjacent one of the bins based on a minimum bin size criterion.

* * * * *